M. F. BRITZ.
EAR RING HOLDER AND LOCK.
APPLICATION FILED JUNE 2, 1916.
1,201,683.
Patented Oct. 17, 1916.
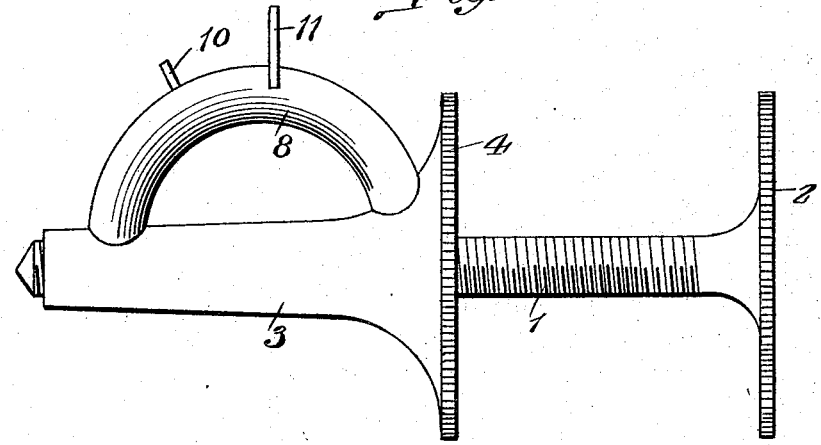
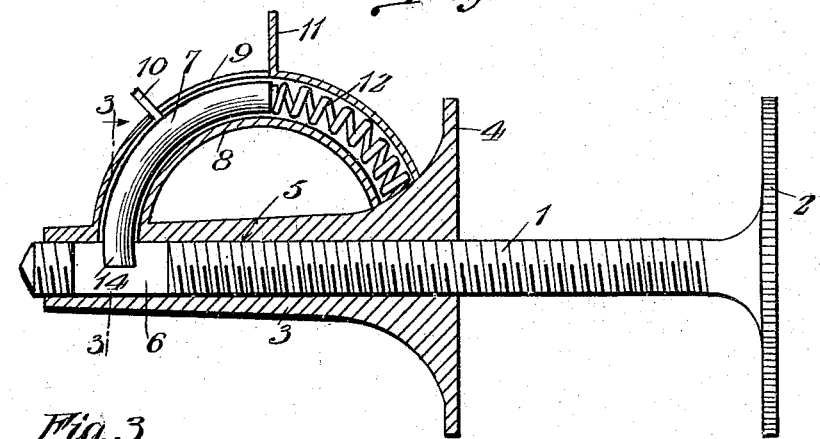
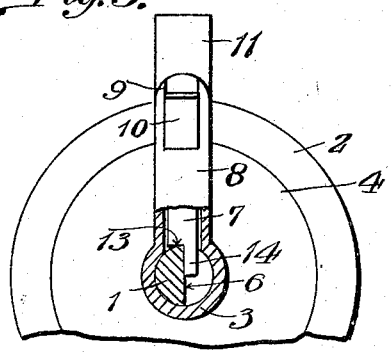
Matthew F. Britz,
Inventor
By Geo. P. Kimmel.
Attorney

UNITED STATES PATENT OFFICE.

MATTHEW F. BRITZ, OF CARBONDALE, PENNSYLVANIA.

EAR-RING HOLDER AND LOCK.

1,201,683.      Specification of Letters Patent.      Patented Oct. 17, 1916.

Application filed June 2, 1916. Serial No. 101,351.

*To all whom it may concern:*

Be it known that I, MATTHEW F. BRITZ, a citizen of the United States and resident of Carbondale, in the county of Lackawanna and State of Pennsylvania, have invented certain new and useful Improvements in Ear-Ring Holders and Locks, of which the following is a specification.

The present invention relates to new and useful improvements in nut and bolt locks and has particular reference to a new and improved latch member for ear-ring carriers.

The primary object of my invention is to provide a locking member of the class described formed to support ear-rings or similar jewelry without danger of loss of the same.

Another object of my invention is to provide a device of the class described which is simple in construction, cheap to manufacture, strong and durable and effective in operation.

Other objects and advantages to be derived from the use of my improved nut locking device will appear from the following detail description and the claims, taken with an inspection of the accompanying drawing, in which:

Figure 1 is a side elevational view of a device embodying the improvements of my invention; Fig. 2 is a longitudinal sectional view of the same; and Fig. 3 is a transverse vertical sectional view taken on the line 3—3 of Fig. 2 looking in the direction of the arrow.

Referring more particularly to the drawing, wherein similar characters of reference designate like and corresponding parts throughout the various views, 1 designates a screw member provided with a knurled head 2.

The screw 1 is to be inserted through an object and I provide a nut or securing body 3 elongated in configuration and having an enlarged knurled portion 4. The member 3 is provided with a threaded bore 5 to receive the screw 1. The screw 1 is provided with a recess 6 adjacent the free end thereof, said recess extending approximately halfway across the diameter of the screw as best shown in Fig. 3. The locking means of my invention includes an arcuate bolt 7 arranged in a complementally curved chamber 8 communicating at one end with the bore 5 of the retaining element 3. The chamber 8 is slotted as at 9 to accommodate the lugs 10 carried by the bolt 7. A lug 11 carried by the chamber 8 extends radially therefrom for a purpose which will hereinafter appear.

A spring element 12 is arranged behind the inner end of the bolt 7, said spring element serving to maintain the bolt in the position shown. The free end of the bolt 7 is recessed as at 13 to form a tongue 14, said tongue being adapted for engagement with the recess 6 in the screw 1.

In using my improved locking and clamping member the screw 1 is moved into the member 3 until the tongue 4 engages with the recess 6. This engagement will prevent withdrawal of the screw. However, rotation of the screw inwardly is not prevented by the recess 6 but the reverse rotation of the screw is prevented. Of course, it is to be understood that I do not limit myself to the application of this device for hanging ear-rings and the like, since by slight modification the same may be applied to various uses. Of course, it will also be understood that the screw member 1 is adapted to engage through the ear of the wearer similarly to the ear-ring clamp now in use. To release the screw 1 the lug 10 is moved to a position adjacent the lug 11, thereby disengaging the bolt 7 from the screw 1.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In a nut lock of the class described, the combination of a bolt having a recess therein, a nut receivable on said bolt, said nut having an arcuate chamber formed integrally therewith, a curved sliding bolt operable in said chamber, means for manipulating said bolt, a spring for moving the locking bolt into engagement with first said bolt, the free ends of said locking bolt being formed with a tongue for engagement in the recess of first said bolt.

2. In a nut lock, the combination of a bolt having a recess adjacent one free end thereof, a nut receivable on said bolt, a chamber formed on said nut, said chamber being arcuate throughout its length and having a similarly formed locking element slidably arranged therein, finger engaging portions for manipulating said locking element, the free end of said locking element being formed with a tongue for engagement with the recesses in said bolt, and a spring member in said chamber behind said locking element for forcing the same into engagement with said bolt.

3. In a nut lock, the combination of a bolt and nut, said bolt having a recess adjacent the free end thereof, said recess having a diametrical wall, a locking element carried by the nut, and spring means for forcing said locking element into engagement with the wall of said recess in said bolt.

4. In a nut lock, the combination of a bolt and nut, said bolt having a recess therein adjacent one end thereof, said recess having a diametrical wall, an arcuate chamber carried by the nut, an arcuate locking member arranged for slidable movement in said chamber, one free end of said locking element having a tongue for engagement with the diametrical wall of said recess to permit rotation of the nut in one direction but preventing reverse rotation of the same in an opposite direction.

In testimony whereof, I affix my signature hereto.

MATTHEW F. BRITZ.

Copies of this patent may be obtained for five cents each, by addressing the "Commissioner of Patents, Washington, D. C."